United States Patent [19]
De Muylder

[11] 3,835,161
[45] Sept. 10, 1974

[54] 3-SUBSTITUTED-4-HYDROXY-COUMARINS

[75] Inventor: Jean Marie De Muylder, Brussels, Belgium

[73] Assignee: Societe D'Etudes Et De Realisations Scientifiques en abrege "S.E.RES.C.I." s.p.r.L., Brussels, Belgium

[22] Filed: Oct. 24, 1972

[21] Appl. No.: 300,084

[30] Foreign Application Priority Data
Oct. 22, 1971 Great Britain.............. 49119/71

[52] U.S. Cl.......................... 260/343.2 R, 424/279
[51] Int. Cl................................................ C07d 7/26
[58] Field of Search........................... 260/343.2 R

[56] References Cited
UNITED STATES PATENTS

| | | | |
|---|---|---|---|
| 2,556,146 | 6/1951 | Olsen | 260/482 C |
| 2,703,810 | 3/1955 | Viard | 260/482 B |
| 2,816,899 | 12/1957 | Enders et al. | 260/343.2 |
| 2,856,411 | 10/1958 | Prill | 260/482 C |
| 2,937,119 | 5/1960 | Berger et al. | 260/482 B |
| 2,960,534 | 11/1960 | Scherer et al. | 260/553 R |
| 2,969,386 | 1/1961 | McElroy | 260/482 B |
| 3,000,931 | 9/1961 | Frankel | 260/482 C |
| 3,347,658 | 10/1967 | Luckenbauch | 260/553 R |

FOREIGN PATENTS OR APPLICATIONS

| | | | |
|---|---|---|---|
| 1,523,597 | 3/1968 | Belgium | 260/309.2 |

OTHER PUBLICATIONS

Degering, An Outline of Organic Nitrogen Compounds, page 532, Ypsilanti, Mich., Univ. Lithoprinters, 1950. QD251.D4.
Wagner et al., Synthetic Organic Chemistry, page 645, N.Y., Wiley, 1953, QD262.W24.

Primary Examiner—John M. Ford
Attorney, Agent, or Firm—Sughrue, Rothwell, Mion, Zinn & Macpeak

[57] ABSTRACT

New 3-substituted-4-hydroxy-coumarins of the formula:

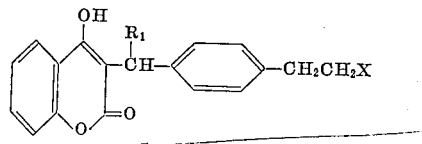

wherein $R_1$ represents a lower alkyl radical containing 1 to 3 carbon atoms and X represents chlorine, bromine or iodine; pharmaceutical compositions containing such compounds and a process for making the compounds are disclosed.

10 Claims, No Drawings

3-SUBSTITUTED-4-HYDROXY-COUMARINS

DETAILED DESCRIPTION OF THE INVENTION

This invention relates to new 3-substituted-4-hydroxy-coumarins, to the preparation thereof and to the use thereof as a blood anticoagulant or having anticlotting activity.

The new 3-substituted-4-hydroxy-coumarins according to this invention may be represented by the following general formula:

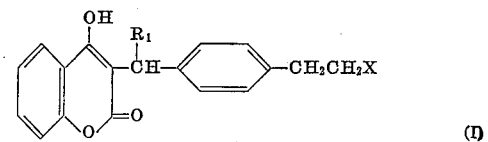

in which $R_1$ represents a lower alkyl radical containing 1 to 3 carbon atoms and X represents chlorine, bromine or iodine.

Among the new compounds according to this invention, the following may be cited:
- 3-(p-chloroethyl-phenyl-1'-ethyl)-4-hydroxy-coumarin (Formula I : $R_1 = CH_3$, X = Cl)
- 3-(p-bromoethyl-phenyl-1'-ethyl)-4-hydroxy-coumarin (Formula I : $R_1 = CH_3$, X = Br)
- 3-(p-iodoethyl-phenyl-1'-ethyl)-4-hydroxy-coumarin (Formula I : $R_1 = CH_3$, X = I)
- 3-(p-chloroethyl-phenyl-1'-propyl)-4-hydroxy-coumarin (Formula I : $R_1 = C_2H_5$, X = Cl)
- 3-(p-bromoethyl-phenyl-1'-propyl)-4-hydroxy-coumarin (Formula I : $R_1 = C_2H_5$, X = Br)
- 3-(p-chloroethyl-phenyl-1'-butyl)-4-hydroxy-coumarin (Formula I : $R_1 = C_3H_7$, X = Cl)
- 3-(p-bromoethyl-phenyl-1'-butyl)-4-hydroxy-coumarin (Formula I : $R_1 = C_3H_7$, X = Br)

It has been found that the compounds according to this invention have interesting pharmacological properties. These compounds have a blood anticoagulant or anticlotting activity. Compared to known anticoagulant compounds, such as 3-(1'-phenylpropyl)-4-hydroxy-coumarin and 3-alpha-acetonyl-p-nitrobenzyl-4-hydroxy-coumarin, the compounds according to the present invention are less toxic and have such an anticoagulant activity that it is easily possible, in case of necessity, to restore the blood coagulability by administration of K1 vitamin. Compared to an equal dose of 3-(1'-phenyl-propyl)-4-hydroxy-coumarin, the 3-(p-chloroethyl-phenyl-1'-butyl)-4-hydroxy-coumarin according to this invention showed, on rats and rabbits, in related doses, stronger, better sustained and longer lasting anticoagulant effects.

This invention relates therefore also to pharmaceutical anticoagulant compositions such as tablets containing, as the active ingredient, at least one compound of the formula I, together with at least one inactive carrier or excipient. The daily human dose is about 1 to 3 milligrams per day.

This invention relates also to a process for preparing the new 3-substituted-4-hydroxy-coumarins of Formula I. According to the invention, said 3-substituted-4-hydroxy-coumarins can be prepared by condensing a secondary alcohol of the formula

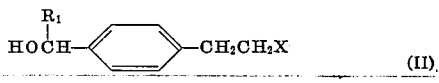

wherein $R_1$ and X are as defined above, with 4-hydroxy-coumarin. This reaction is preferably effected in acetic acid at 81°–82°C. in the presence of a small amount of a catalyst, such as sulfuric acid.

Hereinafter, the preparation of some compounds of this invention is described in the following purely illustrative examples.

EXAMPLE 1

Preparation of 3-(p-chloroethyl-phenyl-1'-butyl)-4-hydroxy-coumarin (Formula I : $R_1 = C_3H_7$, X = Cl)

One prepares first p-chloroethyl-butyrophenone as follows: To a stirred and cooled solution of 133.3 g of aluminum chloride, 103 ml of butyryl chloride and 400 ml of carbon disulfide, one adds a mixture of 140.5 g of phenethyl chloride and 206 ml of butyryl chloride. The mixture is stirred during 1 hour and poured into a mixture of ice and concentrated hydrochloric acid. The mixture is extracted with toluene and the organic layer is washed with a 10 per cent sodium carbonate solution. The toluene is distilled and the residue is purified by vacuum distillation (boiling point : 145°C./15 mm; yield : 85%).

The thus obtained ketone is then trnasformed into p-chloroethyl-phenyl-1-butanol as follows:
To a solution of 126.5 g of the p-chloroethyl-butyrophenone and 600 ml of methyl alcohol, 24 g of sodium borohydride are cautiously added. After 3 hours of stirring, the mixture is poured into 2 liters of diluted hydrochloric acid. After extraction with toluene, the organic layer is dried on sodium sulfate. The solvent is distilled and the alcohol is purified by distillation. The yield is quantitative (boiling point : 147°C./1.7 mm).

The desired 3-(p-chloroethyl-phenyl-1'-butyl)-4-hydroxy-coumarin is then prepared as follows:
32.4 g of 4-hydroxycoumarin are dissolved in 240 ml of pure acetic acid. 4.8 ml of concentrated sulfuric acid are added thereto and the thus obtained solution is heated at 81°–82°C. At said temperature, 56 g of p-chloroethyl-phenyl-1-butanol are added drop by drop, the mixture being stirred during the reaction. After 3 hours of stirring at 81°–82°C., the mixture is poured into 1 liter of cold water and extracted with toluene. The organic layer is washed with water and then extracted with a 2 per cent aqueous solution of sodium carbonate. By addition of hydrochloric acid to the alkaline solution, the 3-(p-chloroethyl-phenyl-1'-butyl)-4-hydroxy-coumarin precipitates and is collected on a filter. It is purified by crystallization from benzene and methyl alcohol (melting point : 135°–136°C).

EXAMPLE 2

Preparation of 3-(p-chloroethyl-phenyl-1'-ethyl)-4-hydroxy-coumarin (Formula I: $R_1 = CH_3$, X = Cl)

The method of Example 1 is repeated except that 4-hydroxy-coumarin is reacted with p-chloroethyl-phenyl-1-ethanol instead of p-chloroethyl-phenyl-1-butanol. The desired product melts at 154°C.

The p-chloroethyl-phenyl-1-ethanol is prepared from p-chloroethyl-acetophenone in a similar way as the alcohol used in Example 1.

The p-chloroethyl-acetophenone is prepared in a similar way as the ketone used as starting material in Example 1.

EXAMPLE 3

Preparation of 3-(p-bromoethyl-phenyl-1'-ethyl)-4-hydroxy-coumarin (Formula I : $R_1 = CH_3$, X = Br)

The method of Example 1 is repeated except that 4-hydroxy-coumarin is reacted with p-bromoethyl-phenyl-1-ehtanol instead of p-chloro-ethyl-phenyl-1-butanol. The desired product melts at 156°C.

The p-bromoethyl-phenyl-1-ethanol is prepared from p-bromoethyl-acetophenone in a similar way as the alcohol used in Example 1.

The p-bromoethyl-acetophenone is prepared in a similar way as the ketone used as starting material in Example 1.

EXAMPLE 4

Preparation of 3-(p-iodoethyl-phenyl-1'-ethyl)-4-hydroxy-coumarin (Formula I : $R_1 = CH_3$, X = I)

The method of Example 1 is repeated except that 4-hydroxy-coumarin is reacted with p-iodoethyl-phenyl-1-ethanol instead of p-chloro-ethyl-phenyl-1-butanol. The desired product melts at 158°C.

The p-iodoethyl-phenyl-1-ethanol is prepared from p-iodoethyl-acetophenone in a similar way as the alcohol used in Example 1.

The p-iodoethyl-acetophenone is prepared in a similar way as the ketone used as starting material in Example 1.

EXAMPLE 5

Preparation of 3-(p-chloroethyl-phenyl-1'-propyl)-4-hydroxy-coumarin (Formula I : $R_1 = C_2H_5$, X = Cl)

The method of Example 1 is repeated except that 4-hydroxy-coumarin is reacted with p-chloroethyl-phenyl-1-propanol instead of p-chloroethyl-phenyl-1-butanol. The desired product melts at 135°C.

The p-chloroethyl-phenyl-1-propanol is prepared from p-chloro-ethyl-phenyl-propionyl ketone in a similar was as the alcohol used in Example 1.

The p-chloroethyl-phenyl-propionyl ketone is prepared in a similar was as the ketone used as starting material in Example 1.

EXAMPLE 6

Preparation of 3-(p-bromoethyl-phenyl-1'-propyl)-4-hydroxy-coumarin (Formula I : $R_1 = C_2H_5$, X = Br)

The method of Example 1 is repeated except that 4-hydroxy-coumarin is reacted with p-bromoethyl-phenyl-1-propanol instead of p-chloroethyl-phenyl-1-butanol.

The p-bromoethyl-phenyl-1-propanol is prepared from p-bromo-ethyl-phenyl-propyl ketone in a similar way as the alcohol used in Example 1.

The p-bromoethyl-phenyl-propyl ketone is prepared in a similar way as the ketone used as starting material in Example 1.

While the invention has been particularly shown and described with reference to preferred embodiments thereof, it will be understood by those skilled in the art that various changes in form and details may be made therein without departing from the spirit and scope of the invention.

What is claimed is:

1. A compound of the formula:

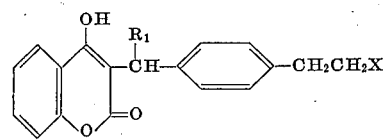

in which $R_1$ represents an alkyl group containing 1 to 3 carbon atoms and X represents chlorine, bromine or iodine.

2. 3-(p-chloroethyl-phenyl-1'-ethyl)-4-hydroxy-coumarin.
3. 3-(p-bromoethyl-phenyl-1'-ethyl)-4-hydroxy-coumarin.
4. 3-(p-iodoethyl-phenyl-1'-ethyl)-4-hydroxy-coumarin.
5. 3-(p-chloroethyl-phenyl-1'-propyl)-4-hydro-coumarin.
6. 3-(p-bromoethyl-phenyl-1'-propyl)-4-hydroxy-coumarin.
7. 3-(p-iodoethyl-phenyl-1'-propyl)-4-hydroxy-coumarin.
8. 3-(p-chloroethyl-phenyl-1'-butyl)-4-hydroxy-coumarin.
9. 3-(p-bromoethyl-phenyl-1'-butyl)-4-hydroxy-coumarin.
10. 3-(p-iodoethyl-phenyl-1'-butyl)-4-hydroxy-coumarin.

* * * * *